United States Patent [19]
Johnson et al.

[11] Patent Number: 5,267,832
[45] Date of Patent: Dec. 7, 1993

[54] FLARABLER RETAINER

[75] Inventors: Donald E. Johnson; Richard J. Bergmann, both of Vernon, Conn.

[73] Assignee: United Technologies Corporation, Hartford, Conn.

[21] Appl. No.: 860,338

[22] Filed: Mar. 30, 1992

[51] Int. Cl.⁵ .................................................. F02C 7/16
[52] U.S. Cl. .................................... 415/115; 29/523; 29/889.2; 411/183; 411/974; 411/967; 403/248; 403/408.1
[58] Field of Search ................ 415/115, 116; 411/173, 411/174, 180, 181, 183, 967, 974, 360, 338, 15, 55; 403/248, 277, 408.1; 81/10; 72/114; 29/889.2, 523

[56] References Cited

U.S. PATENT DOCUMENTS

| | | | |
|---|---|---|---|
| 2,302,501 | 11/1942 | Mears | 403/408.1 |
| 2,612,073 | 9/1952 | Taylor | 411/967 |
| 3,193,921 | 7/1965 | Kahn | 72/114 |
| 3,339,953 | 9/1967 | Bohn | 411/116 |
| 3,913,421 | 10/1975 | Hawkins | 29/523 |
| 4,192,163 | 3/1980 | Martin | 72/114 |
| 4,512,699 | 4/1985 | Jackson et al. | 403/408.1 |
| 4,576,547 | 3/1986 | Weiner et al. | 415/116 |
| 4,652,169 | 3/1987 | Matthews | 403/248 |
| 4,820,475 | 4/1989 | Mayers et al. | 29/523 |
| 4,929,137 | 5/1990 | Bossenmaier | 411/183 |
| 5,120,175 | 6/1992 | Arbegast et al. | 403/408.1 |

Primary Examiner—John T. Kwon

[57] ABSTRACT

A retainer (76) is disclosed for retaining a first element to a second element. Various construction details are developed which provide means to secure a second element to a first element wherein the elements are highly stressed, such as the rotating components of a turbomachine. In one particular embodiment, the retainer has a deformable portion (86) on one end, an internally threaded portion (88), and a shoulder (84) disposed on the end opposite the deformable portion and having a flat surface (92) to prevent rotation of the retainer during assembly. The deformable portion extends through cooperating retainer apertures (52, 68) in the two elements. The deformable portion is flared in place to produce a clinching force between the deformable portion and the shoulder and thereby secure the two elements together.

12 Claims, 4 Drawing Sheets

FLARABLER RETAINER

TECHNICAL FIELD

The present invention relates to retainers and, more particularly, to means for retaining a cooling fluid bleed tube to a gas turbine compressor disk. Although the invention was developed in the field of gas turbine engines, it has applications in other fields as means for retaining together structural elements.

BACKGROUND ART

A typical turbomachine, such as a gas turbine engine used in aircraft applications, includes a compressor section, a combustion section, and a turbine section. A flowpath for working fluid extends axially through the turbomachine and sequentially through each section. The compressor section includes a plurality of airfoil shaped blades disposed on rotating disks. The blades extend radially through the flowpath and interact with the working fluid. The compressor section adds energy, in the form of increased momentum, to the working fluid as it is flowed through the compressor section. The combustion section mixes fuel with the working fluid and burns the mixture to add more energy to the working fluid. The products of the combustion process are then expanded through the turbine section to transfer energy from the working fluid to the turbine section. The turbine section includes a plurality of airfoil shaped blades which extend from rotating disks and through the flowpath. A portion of the energy removed from the working fluid by the turbine section is then transferred to the compressor section via rotors connecting the compressor disks and the turbine disks. This energy is then used to compress incoming working fluid in the compressor section.

One result of the combustion process is an increase in the temperature of the working fluid flowing out of the combustion section and through the turbine section. The energy added by the combustion process is directly proportional to the increase in temperature of the working fluid. The allowable temperature, and consequently the output of the turbomachine, is limited by the temperature characteristics of the turbine section. Extremely high temperatures can adversely affect the structural integrity of the components within the turbine section. Highly stressed components, such as turbine disks, must be maintained below acceptable temperature limits which depend upon material properties. In addition, rotating seals, which block working fluid from escaping the flowpath within the turbine section, must be maintained within acceptable temperature limits to ensure proper functioning.

Cooling fluid is used to protect the components within the turbine section and thereby extend the operating temperature range of the turbine engine. A typical cooling system bleeds working fluid from the compressor section. The bleed fluid is flowed around the combustion section, in order to bypass the combustion process, and into the turbine section.

One means of bleeding fluid from the compressor section is to use a cooling fluid bleed tube known as an anti-vortex tube. The anti-vortex tube bleeds compressed working fluid from a stage of the compressor section. The stage is selected to have an appropriate pressure differential. Pressure differential is the difference between pressure at the selected stage of the compressor and pressure in the region of the turbine section to be cooled. Sufficient pressure differential is needed to ensure an adequate flow of cooling fluid. The anti-vortex tube provides a radially oriented flow passage. The flow passage permits cooling fluid to flow from the compressor through a cavity defined by the separation of the rotor and compressor disks and into a region radially adjacent to the rotor in towards the rotor. The flow passage avoids pressure losses which would normally occur if the cooling fluid were bled directly into the rotating annulus of fluid in the cavity between the compressor disk and rotor. Upon exiting the anti-vortex tube, the cooling fluid, because of its high pressure relative to the fluid within the region of the turbine section to be cooled, travels axially downstream along the rotor. The cooling fluid passes into the turbine section where it provides cooling for turbine section components.

Means for retaining the anti-vortex tube to the compressor disk must accommodate both static load forces and rotational forces resulting from operation of the gas turbine engine. A primary concern is the level stress in the rotating compressor disks. The rotational forces present in the turbomachine result in compressor disks which are highly stressed during operational conditions. Typical retaining means, such as threaded inserts and threaded apertures, cannot be used due to the local stress concentrations associated with the threads. Another concern is foreign object damage to fragile rotating components of the compressor section, such as the rotating blades and rotating seals. Foreign object damage may occur if the retaining means fails and permits portions of the retaining means or anti-vortex tube to enter the flowpath of the working fluid. The failure of the retaining mechanism may result in damage propagating throughout the turbomachine.

The current means of retaining anti-vortex tubes to the compressor disk is to flare the inlet end of the anti-vortex tube. The flared inlet end conforms to the aperture in the compressor disk. A flange, disposed on the tube and in abutting contact with the disk, combines with the flared inlet to provide a clinching force. In effect, the flared portion and the flange clinch the tube to the disk. By using a flared type retention means rather than a threaded type retention means, the local stress concentration associated with threaded apertures is avoided in the compressor disk. In addition, if the flared retention should fail, the flange prevents the anti-vortex tube from entering the compressor section flowpath.

Although the current retaining means has proven satisfactory, there are several limitations to its use. The first is that the flared anti-vortex tube cannot be reused once it has been removed. Upon removal, the tube must be replaced with a new tube which is then flared into place. This represents an increase in cost associated with repair and refurbishment of the turbomachine. A second limitation is that the inlet end of the anti-vortex tube is required to be a flared opening. The opening cannot be modified to produce improved flow characteristics.

The above art not withstanding, scientists and engineers under the direction of Applicants' Assignee are working to develop means for retaining an anti-vortex tube to a compressor disk of a turbomachine.

DISCLOSURE OF INVENTION

According to the present invention, a retainer includes a deformable portion disposed longitudinally on one end, means to engage flaring means, a shoulder disposed on the end longitudinally opposite of the deformable portion, and means to prevent rotation about the longitudinal axis of the retainer when the retainer is engaged with the flaring means.

According to a specific embodiment of the present invention, the retainer further includes an internally threaded portion disposed longitudinally adjacent to the deformable portion and adapted to engage a threaded surface of the flaring means, the threaded portion and deformed portion defining a central bore, and the means to prevent rotation includes a flat edge disposed on the shoulder and adapted to engage a cooperating surface disposed on one of the elements.

According to another embodiment of the present invention, an anti-vortex tube assembly for a turbomachine includes a retainer having a deformable portion adapted to pass through a pair of retainer apertures in the anti-vortex tube assembly and a compressor disk, the deformable portion adapted to be deformed to approximate the shape of the retainer aperture in the compressor disk, an internally threaded portion adapted to engage flaring means, a shoulder disposed longitudinally opposite of the deformable portion and adapted to engage in abutting contact with the anti-vortex tube assembly, and means to prevent rotation of the retainer when the shoulder is in abutting contact with the anti-vortex tube assembly.

According further to the present invention, a method of securing a first element having a first aperture to a second element having a second aperture, using a flaring tool and a retainer having a deformable portion, means to engage the flaring tool, and a shoulder having anti-rotation means, includes the following steps: first, aligning the apertures of the elements; second, inserting the deformable portion of the retainer through the aligned apertures such that the shoulder engages the second element; and third, engaging the flaring tool with the retainer such that the deformable portion approximates the shape of the first aperture.

A principal feature of the present invention is the integrating of a deformable portion, means to engage flaring means, and anti-rotation means into a single structure. Another feature is the shoulder disposed longitudinally opposite of the deformable portion. A further feature is the internally threaded portion of the retainer disposed adjacent to the deformable portion and which is adapted to engage a flaring means.

A primary advantage of the present invention is the ease of flaring of the deformable portion of the retainer which results from having the internally threaded portion and the anti-rotation means integral to the retainer. Another advantage is the avoidance of local stress concentrations associated with threaded apertures because the deformable portion and shoulder provide a clinching force to secure the elements together. A further advantage is the ease of engagement of the retainer with flaring means as a result of the internally threaded portion.

Although described and shown in FIGS. 1-6 as a means for retaining an anti-vortex tube assembly to a compressor disk of a turbomachine, it should be understood that the retainer is equally applicable as a retainer for other, non-turbomachine related structural elements, especially elements for which threaded apertures are inapplicable.

The foregoing and other objects, features and advantages of the present invention become more apparent in light of the following detailed description of the exemplary embodiments thereof, as illustrated in the accompanying drawings.

BEST MODE FOR CARRYING OUT THE INVENTION

Figure 1:
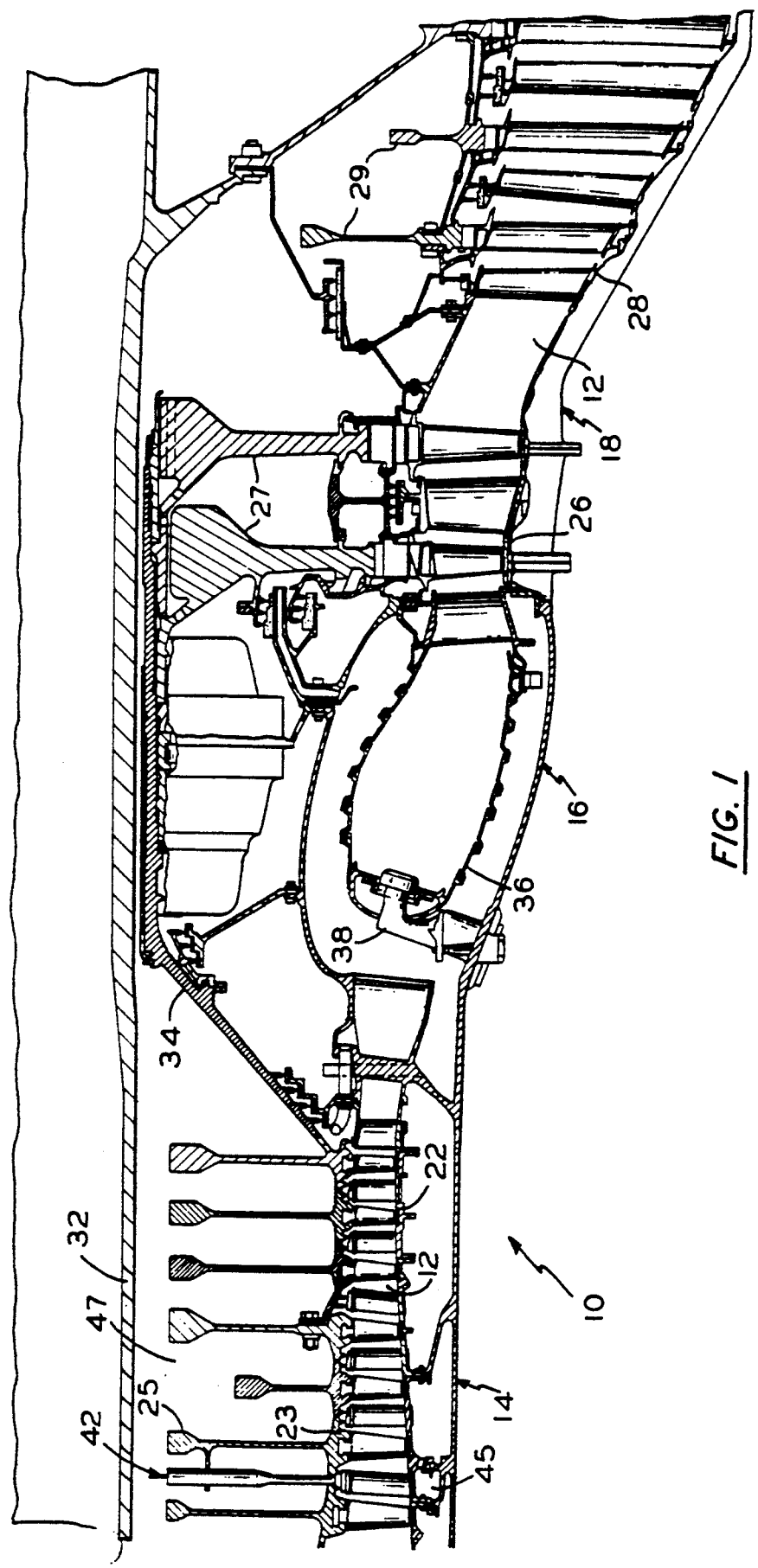
FIG. 1 is a cross-sectional view of a gas turbine engine which illustrates a portion of a compressor section, a combustion section, and a turbine section.

FIG. 1 is an illustration of a typical gas turbine engine 10. The gas turbine engine includes an annular flowpath 12 extending axially through a compressor section 14, a combustion section 16, and a turbine section 18. The compressor section 14 includes a high pressure compressor 22, having a rotor drum 23 comprised of a plurality of rotating disks 23, and a low pressure compressor (not shown). The turbine section 18 has a high pressure turbine 26 having a plurality of rotating disks 27 and a low pressure turbine 28 having a plurality of rotating disks 29. A low pressure rotor 32 connects the low pressure turbine disks 29 to the low pressure compressor. A high pressure rotor 34 connects the high pressure turbine disks 27 to the high pressure compressor rotor drum 23. Working fluid is conducted through the flowpath 12 of the compressor section 14 and into the combustion section 16. The combustion section 16 includes a combustor 36 and a plurality of fuel nozzles 38 which inject fuel into the working fluid. The mixture of fuel and working fluid is then burned in the combustor 36. The combustion products are expanded first through the high pressure turbine 26 and then through the low pressure turbine 28. Energy extracted from the expanding gases is transferred to the compressor section 14 via the rotors 32, 34 and used to compress incoming working fluid.

Figure 2:
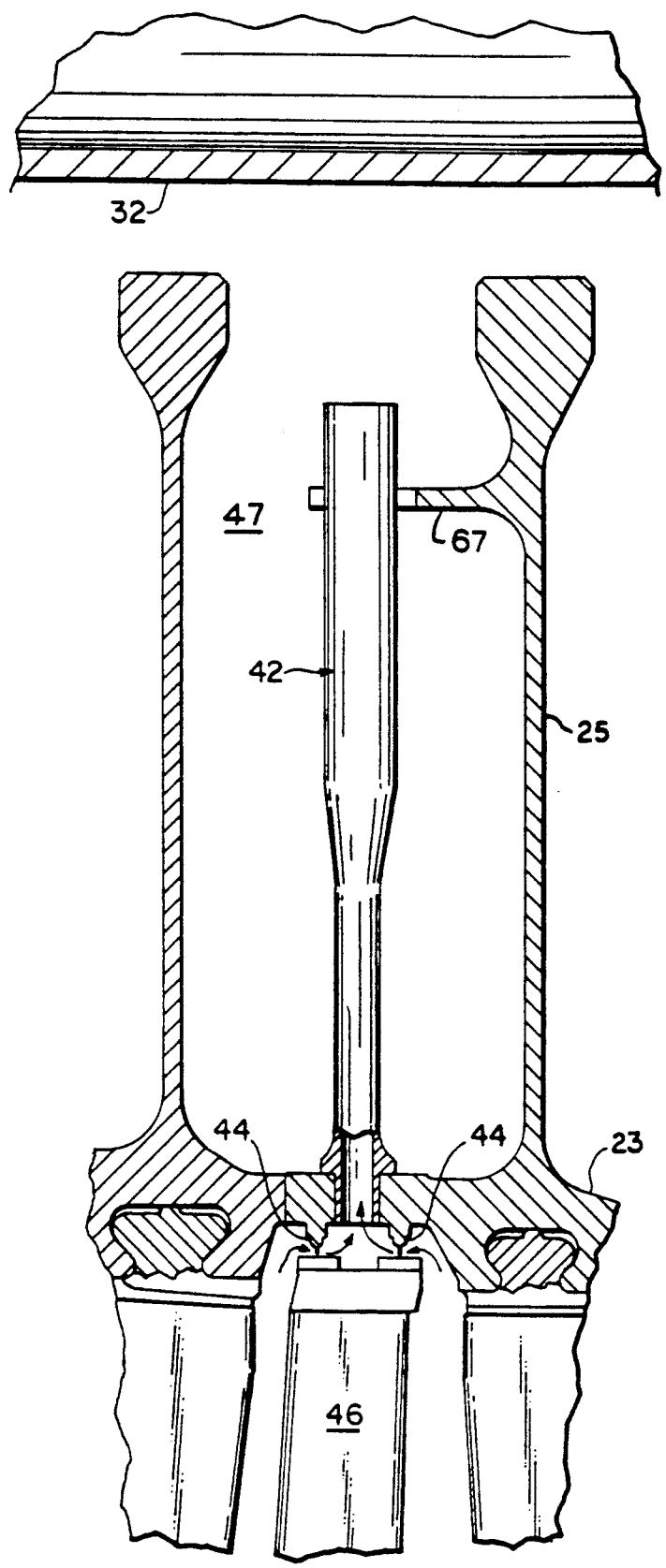
FIG. 2 is a cross-sectional view of an anti-vortex tube disposed within the compressor section.

The compressor section 14 includes a plurality of anti-vortex tube assemblies 42 which extend radially inward between two of the compressor disks 25. As shown more clearly in FIG. 2, each anti-vortex tube assembly 42 extends between the compressor rotor drum 23 and the low pressure rotor 32. The anti-vortex tube assemblies 42 are disposed axially between a pair of rotating seals 44 engaged with a stator assembly 46. Cooling fluid flows from a cavity 45 radially outward of the stator assembly 46, through a flow passage of the stator assembly 46, passes through the anti-vortex tube assemblies 42 and radially inward toward the low pressure rotor 32. The anti-vortex tube assemblies 42 are designed to permit passage of cooling fluid from the cavity 45 to a region adjacent to the low pressure rotor 32 without a significant loss in pressure as the cooling fluid flows radially through a cavity 47 defined by the separation of the low pressure rotor 32 and the rotor drum 23. The maintenance of a pressure differential between cooling fluid exiting the tube 42 and the fluid within the turbine section 18 is necessary in order to create a flow of cooling fluid along the low pressure rotor 32 from the compressor section 14 to the turbine section 18. This fluid flows along the low pressure rotor 32, between the low pressure rotor 32 and high pressure rotor 34, and then into the turbine section 18. In the turbine section 18, the fluid provides cooling to various turbine components.

Figure 3:
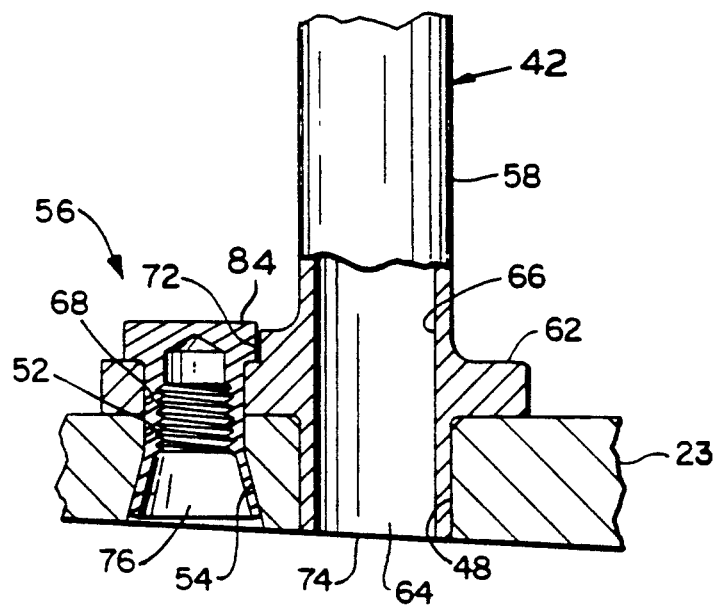
FIG. 3 is a cross-sectional view of a retainer which secures the anti-vortex tube to a compressor disk.

Referring now to FIG. 3, the high pressure compressor rotor drum 23 includes an anti-vortex tube aperture 48 and a retainer aperture 52. The anti-vortex tube aperture 48 is shaped to accommodate the anti-vortex tube assembly 42. The retainer aperture 52 has a frustoconical surface 54 shaped to accommodate retention means 56 of the anti-vortex tube assembly 42.

Each anti-vortex tube assembly 42 includes a tube portion 58, a flange 62, a head 64, and retainer means 56. The tube portion 58 includes a conduit 66 which defines the passage for cooling fluid. The tube portion 58 is restrained from circumferential movement by engagement with an extension 67 of the compressor disk 25. The flange 62 is in abutting contact with the rotor drum 23 and includes a retainer aperture 68 and a flat surface 72. The head 64 includes a flow inlet 74 for the cooling fluid and is seated within the aperture 48 in the rotor drum 23 for the anti-vortex tube 42.

Retention means 56 for the anti-vortex tube 42 is comprised of a flarable retainer 76 which passes through the retainer aperture 68 in the tube 42 and the corresponding retainer aperture 52 in the rotor drum 23. The retainer 76 includes a central bore 78 disposed about a longitudinal axis 82 of the retainer 76 and a shoulder 84 disposed on one end. The central bore 78 is defined by a deformable portion 86 located on the end opposite the shoulder 84 and an internally threaded portion 88 located axially between the deformable portion 86 and the shoulder 84. The threaded portion 88 provides means to engage flaring means (see FIGS. 5 and 6) and is configured to engage correspondingly threaded portion of flaring means. The shoulder 84 is in abutting contact with the flange 62 of the anti-vortex tube 42 and includes a flat surface 92 which is parallel with the cooperating flat surface 72 of the anti-vortex tube 42. The engagement of the two flat surfaces 72, 92 provides anti-rotation means for the retainer. The anti-rotation means prevents rotation of the retainer 76 during engagement of the retainer 76 with the flaring means.

The retainer 76 secures the anti-vortex tube assembly 42 to the rotor drum 23. The deformable portion 86 is shaped to engage the frustoconical surface 54 of retainer aperture 52 and thereby provide a clinching force between the deformable portion 86 and the shoulder 84 which abuts the flange 62. The clinching force squeezes the flange 62 to the rotor drum 23.

Figure 4:
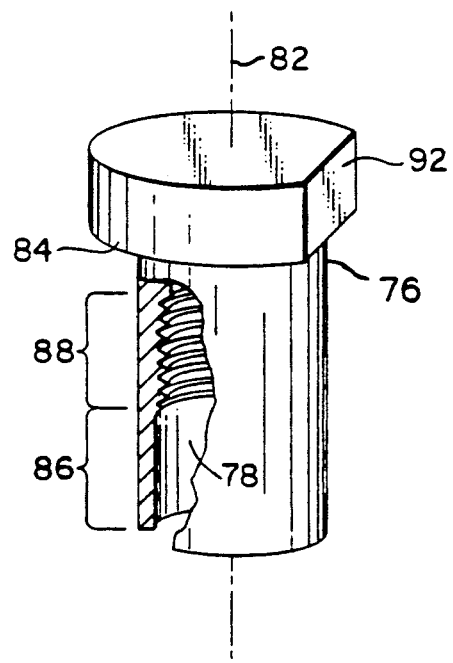
FIG. 4 is a perspective view of a retainer prior to flaring.

The anti-vortex tube assembly is assembled into the gas turbine engine in the following manner. Prior to installation, the retainer 76 is as shown in FIG. 4. It should be noted that the deformable portion 86 of the retainer 76 prior to installation is not flared. The first step in the assembly procedure is to insert the retainer 76 into the retainer aperture 68 and to temporarily secure the retainer 76 to the anti-vortex tube assembly 42.

Figure 5:
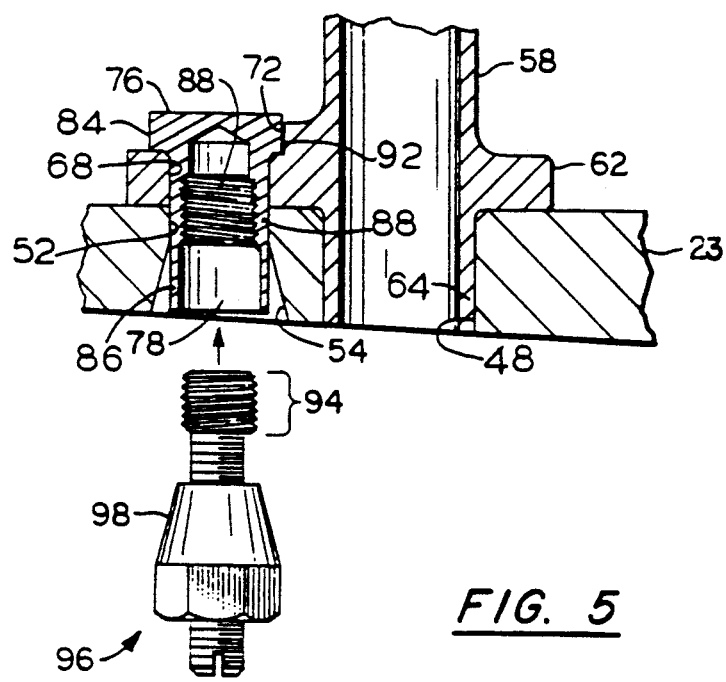
FIG. 5 is a cross-sectional view of an anti-vortex tube, retainer, and flaring tool prior to engagement of the flaring tool with the retainer.
Figure 6:
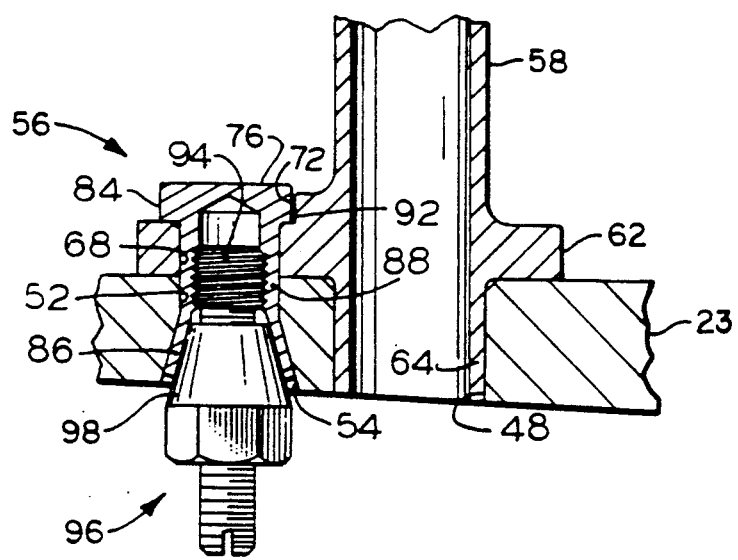
FIG. 6 is cross-sectional view of the anti-vortex tube, retainer, and flaring tool with the retainer engaged with and the flaring tool.

The retainer 76 is inserted such that the deformable portion 86 extends through the retainer apertures 52, 68 and adjacent to the frustoconical surface 54 and the shoulder 84 abuts the flange 62. In addition, the flat surface 92 of the retainer 76 is aligned with the flat surface 72 of the flange 62. Temporarily securing the retainer is necessary in situations, such as illustrated in FIG. 1, where access to the inserted retainer is blocked. In other situations, the retainer apertures may be aligned first and then the retainer inserted through the aligned apertures. A suggested means to secure the retainer 76 is to use an inert adhesive which disintegrates at elevated temperatures, such as those encountered during operation. The second step is to insert the head 64 into the anti-vortex tube aperture 48 such that the flange 62 abuts the rotor drum 23 and the retainer 76 is inserted into the retainer aperture 52. The third step is to insert flaring means through the central bore 78 and engage the threaded portion 88 of the retainer 76 with a correspondingly threaded portion 94 of flaring means, as shown in FIG. 6. The flaring means may be a flaring tool 96 as shown in FIGS. 5 and 6. Once the threaded portions 88, 94 of the retainer 76 and flaring tool 96 are engaged, a flaring surface 98 of the flaring tool 96 can be engaged with the deformable portion 86 of the retainer 76. The deformable portion 86 is flared to approximate the shape of the frustoconical surface 54 of the retainer aperture 52 of the rotor drum 23. It should be noted that the retainer 76 may be flared even if access to the shoulder is blocked. This results from having the internally threaded portion 88 disposed about the central bore 78 and adjacent to the deformable portion 86, and from having anti-rotation means integral to the retainer 76. The final step is to disengage the flaring surface 98 of the flaring tool 96 from the deformable portion 86 of the retainer 76, and then to disengage the threaded portions 88, 94 of the flaring tool 96 and retainer 76.

During operation, rotational forces urge the anti-vortex tube assembly 42 radially outward. The rotational forces cause the head 64 to seat into the anti-vortex tube aperture 48 and the flange 62 to abut the rotor drum 23. With the turbine engine 10 in a non-operational condition (i.e. non-rotating), the static weight loading may urge the anti-vortex tube assembly 42 to pull away from the rotor drum 23. The retainer 76 provides a clinching force which retains the anti-vortex tube assembly to the rotor drum 23. In addition, moment loads about the retainer 76 are reacted by contact between the head 64 of the anti-vortex tube assembly 42 and the anti-vortex tube aperture 48.

It should be noted that, although the invention is illustrated in FIGS. 1-6 as means to retain an anti-vortex tube assembly to a gas turbine compressor rotor drum, the invention is equally applicable as means to retain other non-turbine related structures together.

Although the invention has been shown and described with respect to exemplary embodiments thereof, it should be understood by those skilled in the art that various changes, omissions, and additions may be made thereto, without departing from the spirit and scope of the invention.

We claim:

1. A retainer adapted to retain a first element having a first retainer aperture therethrough, a portion of which being frustoconical in shape, to a second element having a second retainer aperture therethrough, the first and second retainer apertures adapted to align to permit insertion of said retainer therethrough, said retainer having a longitudinal axis, an uninstalled condition, and an installed condition resulting from engagement with flaring means having a flaring surface, said retainer including:

a deformable portion disposed about the longitudinal axis, said deformable portion adapted to be deformed by the flaring means to approximate the shape of the frustoconical portion of the first retainer aperture;

means to engage the flaring means;

a shoulder disposed longitudinally opposite of the deformable portion, said shoulder adapted to engage in abutting contact with the second element in an installed condition;

means to prevent rotation of said retainer during engagement of said retainer with the flaring means; and wherein in the uninstalled condition said retainer is adapted to extend through the aligned retainer apertures such that said shoulder abuts the second element and said deformable portion is adjacent to the frustoconical portion of the first retainer aperture, wherein engagement of said retainer means with the flaring means causes contact between said deformable portion and the flaring surface, and wherein in said installed condition said deformable portion engages the frustoconical portion of the first element.

2. The retainer according to claim 1, wherein the flaring means is comprised of a flaring tool having a threaded surface and a flaring surface, and wherein said means to engage the flaring means comprises an internally threaded portion disposed longitudinally between said deformable portion and said shoulder, said threaded portion and said deformable portion defining a central bore, and wherein the threaded portion is adapted to engage the threaded surface of the flaring means by insertion of the flaring tool through said central bore.

3. The retainer according to claim 1, wherein said anti-rotation means is comprised of a flat surface disposed on said shoulder and adapted to engage with a cooperating surface disposed on the second element.

4. The retainer according to claim 2, wherein the first element is a compressor rotor drum of a turbomachine and the second element is an anti-vortex tube assembly.

5. An anti-vortex tube assembly in a turbomachine including a compressor rotor drum having a frustoconical retainer aperture, said assembly including an anti-vortex tube having a conduit, a flange, a head, and a retaining means disposed about a longitudinal axis, wherein said retaining means includes a retainer having deformable portion, means to engage flaring means, a shoulder disposed longitudinally opposite of the deformable portion, said deformable portion adapted to be flared to the frustoconical shape of the retainer aperture, said shoulder adapted to engage in abutting contact with the flange of the tube, and means to prevent rotation of the retainer about the longitudinal axis.

6. The anti-vortex tube assembly according to claim 5, wherein the flaring means is comprised of a flaring tool having a threaded surface and a flaring surface, and wherein said means to engage the flaring means comprises an internally threaded portion disposed longitudinally between said deformable portion and said shoulder, said threaded portion and said deformable portion defining a central bore, and wherein the threaded portion is adapted to engage the threaded surface of the flaring means by insertion of the flaring tool through said central bore.

7. The anti-vortex tube assembly according to claim 5, wherein said anti-rotation means is comprised of a flat surface disposed on said shoulder and adapted to engage with a cooperating surface disposed on the flange.

8. A method of securing a first element to a second element using a retainer and flaring means, wherein the first element has a first retainer aperture therethrough, a portion of which being frustoconical in shape, the second element having a second retainer aperture therethrough, the first and second apertures adapted to align to permit insertion of the retainer therethrough, the retainer having a deformable portion adapted to be flared to approximate the shape of the first retainer aperture, means to engage the flaring means, and a shoulder adapted to engage in abutting contact with the second element, the shoulder including anti-rotation means adapted to engage the second element to prevent rotation of the retainer, the method comprising the steps of:

1) positioning the first element and the second element such that the retainer apertures are aligned;
2) inserting the deformable portion of the retainer through the aligned apertures such that the shoulder engages the second element and the anti-rotation means engages the second element; and
3) engaging the flaring means with the retainer such that the deformable portion is flared to approximate the shape of the first aperture.

9. A method of securing a first element to a second element using a retainer and flaring means, wherein the first element has a first retainer aperture therethrough, a portion of which being frustoconical in shape, the second element having a second retainer aperture therethrough, the first and second apertures adapted to align to permit insertion of the retainer therethrough, the retainer having a deformable portion adapted to be flared to approximate the shape of the first retainer aperture, means to engage the flaring means, and a shoulder adapted to engage in abutting contact with the second element, the shoulder including anti-rotation means adapted to engage the second element to prevent rotation of the retainer, the method comprising the steps of:

1) inserting the deformable portion of the retainer through the second retainer aperture such that the shoulder and the anti-rotation means engages the second element;
2) securing the retainer to the second element;
3) positioning the first element and the second element such that the deformable portion is inserted through the first retainer aperture; and
4) engaging the flaring means with the retainer such that the deformable portion is flared to approximate the shape of the first aperture.

10. The method according to claim 8 or 9, wherein the flaring means includes a flaring tool having a threaded surface and a flaring surface, wherein the means to engage the flaring means includes an internally threaded portion disposed longitudinally between the deformable portion and the shoulder, wherein the threaded portion and deformable portion define a central bore, and wherein the step of engaging the flaring means with the retainer includes inserting the threaded surface of the flaring tool through the central bore such that the threaded surface engages the threaded portion of the retainer and the flaring surface engages the deformable portion of the retainer.

11. The method according to claim 8 or 9, wherein the anti-rotation means includes a flat surface disposed on said shoulder and adapted to engage with a cooperating surface disposed on the second element, and wherein the step of inserting the deformable portion includes engaging the flat surface with the cooperating surface such that rotation of the retainer is prevented.

12. The method according to claim 8 or 9, wherein the first element is a compressor rotor drum of a turbomachine having an anti-vortex tube aperture, the second element is an anti-vortex tube assembly having a flange and a head, and wherein the step of positioning the elements includes inserting the head into the anti-vortex tube aperture such that the flange abuts the compressor rotor drum.

* * * * *